(12) United States Patent
Dillinger

(10) Patent No.: US 10,899,260 B2
(45) Date of Patent: Jan. 26, 2021

(54) HEADREST OF A VEHICLE SEAT

(71) Applicant: Adient Luxembourg Holding S.á r.l., Luxembourg (LU)

(72) Inventor: Thomas Dillinger, Ratingen (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 15/765,832

(22) PCT Filed: Oct. 5, 2016

(86) PCT No.: PCT/EP2016/073813
§ 371 (c)(1),
(2) Date: Apr. 4, 2018

(87) PCT Pub. No.: WO2017/060313
PCT Pub. Date: Apr. 13, 2017

(65) Prior Publication Data
US 2019/0111819 A1      Apr. 18, 2019

(30) Foreign Application Priority Data

Oct. 5, 2015   (DE) .......................... 10 2015 219 210

(51) Int. Cl.
| | | |
|---|---|---|
| A47C 1/10 | (2006.01) |
| B60N 2/853 | (2018.01) |
| B60N 2/821 | (2018.01) |
| B60N 2/829 | (2018.01) |
| B60N 2/75 | (2018.01) |
| B60N 2/85 | (2018.01) |

(52) U.S. Cl.
CPC ............. *B60N 2/853* (2018.02); *B60N 2/767* (2018.02); *B60N 2/77* (2018.02); *B60N 2/821* (2018.02); *B60N 2/829* (2018.02); *B60N 2/85* (2018.02)

(58) Field of Classification Search
CPC .......... B60N 2/821; B60N 2/829; B60N 2/77; B60N 2/85; B60N 2/853; B60N 2/767; B60N 2/865; B60N 2/80; B60N 2/809; B60N 2/888
USPC .................................. 297/408, 410, 391, 406
See application file for complete search history.

(56) References Cited

U.S. PATENT DOCUMENTS

| | | | |
|---|---|---|---|
| 2,837,931 A | 6/1958 | Brundage | |
| 4,674,790 A | 6/1987 | Johnson | |
| 5,222,784 A | 6/1993 | Hamelin | |
| 6,471,296 B2 * | 10/2002 | Lance ...................... | A47C 7/38 297/410 |

(Continued)

FOREIGN PATENT DOCUMENTS

| | | |
|---|---|---|
| JP | S59118447 U | 8/1984 |
| JP | H5-146341 A | 6/1993 |

(Continued)

*Primary Examiner* — Chi Q Nguyen
(74) *Attorney, Agent, or Firm* — Marshall & Melhorn, LLC

(57) ABSTRACT

A headrest (1) of a vehicle seat includes a first head support device (1') and a second head support device (1"). The headrest includes a tilting device (7) for tilting the first head support device (1') relative to the second head support device (1"). The headrest (1) includes a height adjusting device (9) for adjusting the height of the first head support device (1') relative to the second head support device (1"). A vehicle seat is also provided including an arm rest and a device.

20 Claims, 5 Drawing Sheets

(56) References Cited

U.S. PATENT DOCUMENTS

| | | | | |
|---|---|---|---|---|
| 7,232,187 | B1* | 6/2007 | Sundararajan | B60N 2/0232 297/410 |
| 7,350,859 | B2* | 4/2008 | Klukowski | B60N 2/888 297/216.12 |
| 7,517,015 | B2* | 4/2009 | Terada | B60N 2/888 297/216.12 |
| 8,657,378 | B2* | 2/2014 | Kunert | B60N 2/815 297/391 |
| 8,814,265 | B2* | 8/2014 | Froese | B60N 2/865 297/216.12 |
| 9,085,253 | B2* | 7/2015 | Delling | B60N 2/865 |
| 9,365,140 | B2* | 6/2016 | Falster | B60N 2/821 |
| 9,758,076 | B2* | 9/2017 | An | B60N 2/0232 |
| 9,815,392 | B2* | 11/2017 | Ishihara | B60N 2/865 |
| 9,878,645 | B2* | 1/2018 | Kim | B60N 2/0232 |
| 9,950,652 | B2* | 4/2018 | Line | B60N 2/0232 |
| 10,099,592 | B2* | 10/2018 | Line | B60N 2/0232 |
| 2004/0262974 | A1* | 12/2004 | Terada | B60N 2/865 297/407 |
| 2005/0077762 | A1* | 4/2005 | Kraemer | B60N 2/865 297/216.12 |
| 2005/0280304 | A1* | 12/2005 | Akaike | B60N 2/0232 297/391 |
| 2006/0226689 | A1* | 10/2006 | Linnenbrink | B60N 2/829 297/408 |
| 2007/0075578 | A1* | 4/2007 | Klukowski | B60N 2/888 297/391 |
| 2007/0085400 | A1* | 4/2007 | Terada | B60N 2/888 297/391 |
| 2007/0241593 | A1* | 10/2007 | Woerner | B60N 2/865 297/216.12 |
| 2008/0303262 | A1* | 12/2008 | Sakakida | B60N 2/865 280/806 |
| 2009/0121526 | A1* | 5/2009 | Akaike | B60N 2/002 297/216.12 |
| 2009/0302660 | A1* | 12/2009 | Karlberg | B60N 2/885 297/404 |
| 2010/0117410 | A1* | 5/2010 | Akaike | B60R 21/04 297/216.12 |
| 2010/0283306 | A1* | 11/2010 | Boes | B60N 2/809 297/408 |
| 2012/0032487 | A1* | 2/2012 | Yamaguchi | B60N 2/002 |
| 2014/0252835 | A1* | 9/2014 | Kotz | B60N 2/809 297/354.1 |
| 2015/0130247 | A1 | 5/2015 | Kondrad et al. | |
| 2015/0183347 | A1* | 7/2015 | Falster | B60N 2/821 297/410 |
| 2015/0251575 | A1* | 9/2015 | Ishihara | B60N 2/829 297/391 |

FOREIGN PATENT DOCUMENTS

| | | |
|---|---|---|
| JP | H09-123816 A | 5/1997 |
| KR | 10-1997-0074225 A1 | 12/1997 |

* cited by examiner

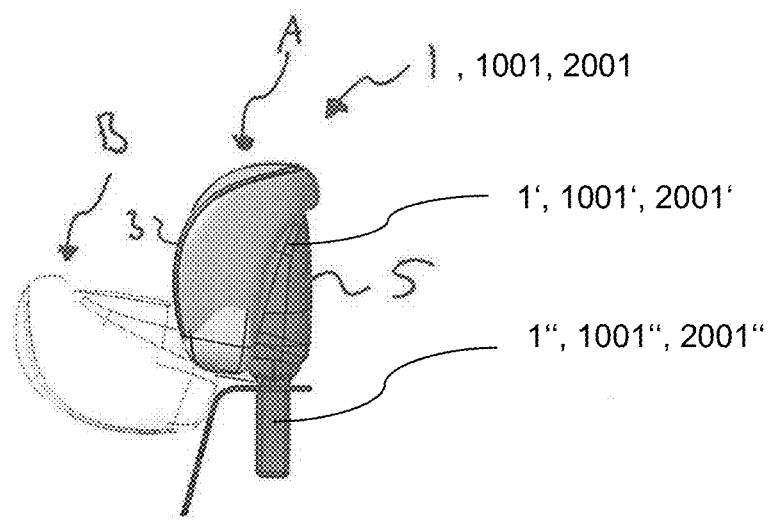
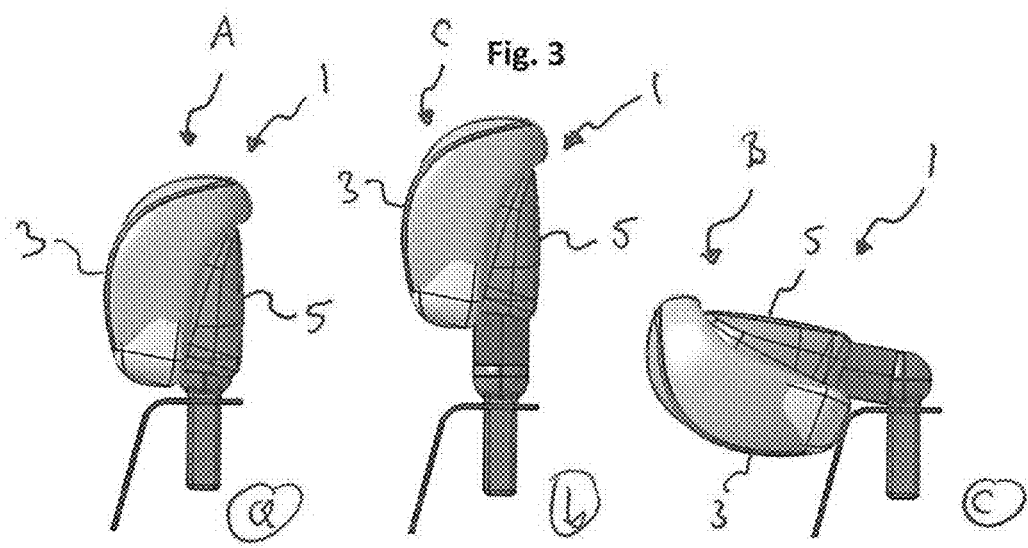
Fig. 3
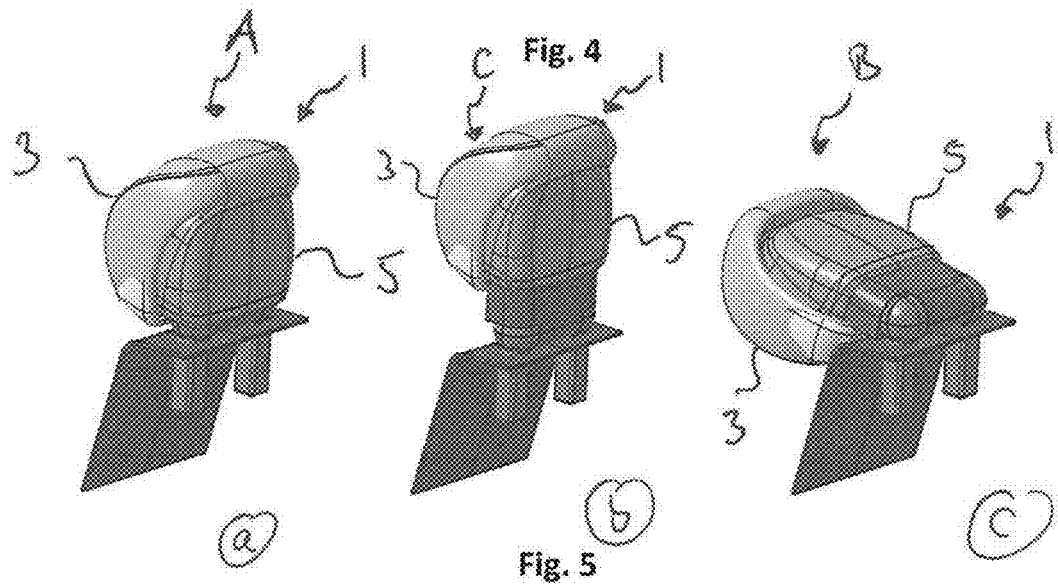
Fig. 4
Fig. 5

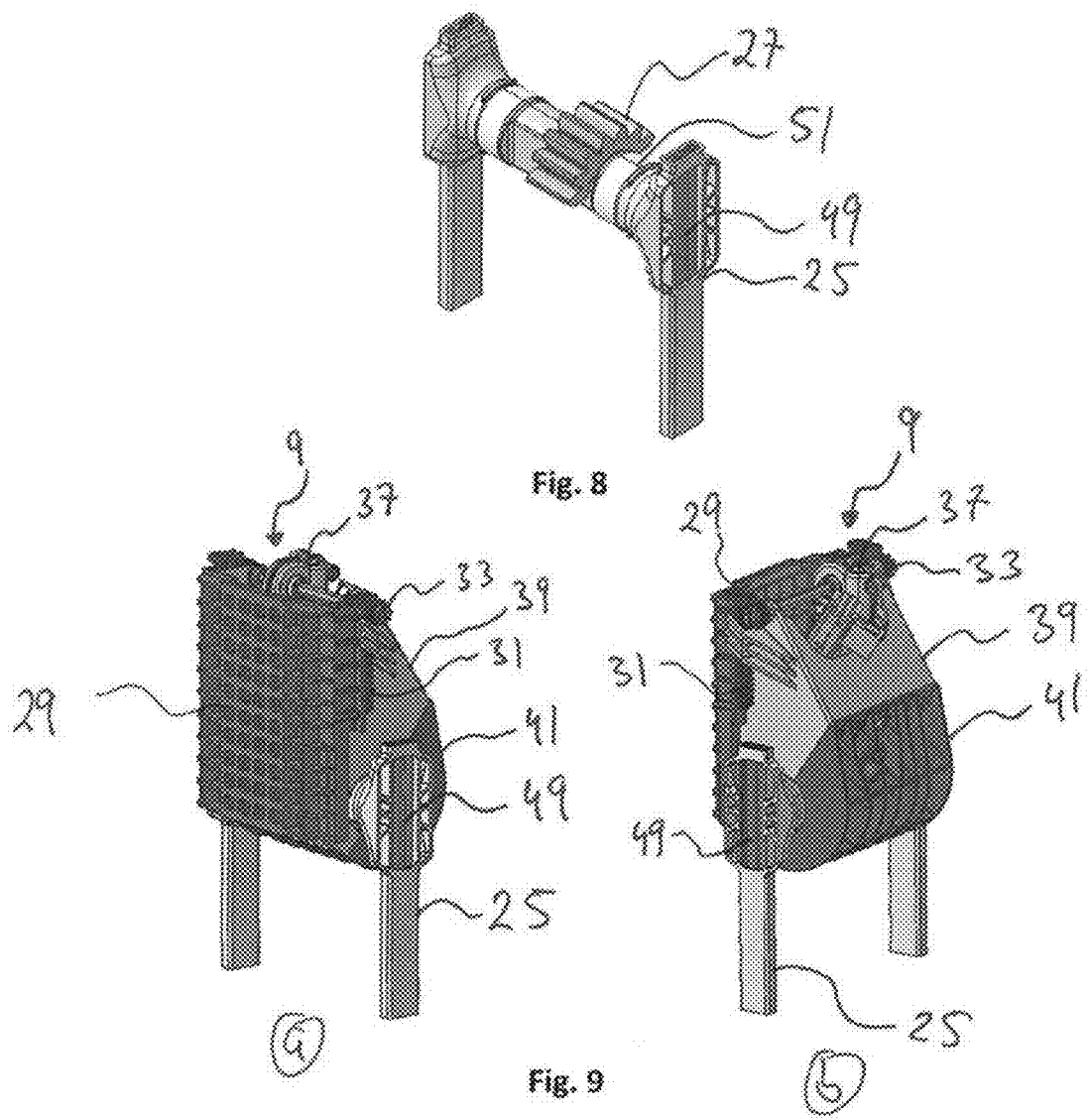

HEADREST OF A VEHICLE SEAT

CROSS REFERENCE TO RELATED APPLICATIONS

This application is a United States National Phase Application of International Application PCT/EP2016/073813, filed Oct. 5, 2016, and claims the benefit of priority under 35 U.S.C. § 119 of German Application 10 2015 219 210.5, filed Oct. 5, 2015, the entire contents of which are incorporated herein by reference.

FIELD OF THE INVENTION

The invention relates to a headrest of a vehicle seat, wherein the headrest comprises a first headrest device and a second headrest device, wherein the headrest comprises a tilting device for tilting the first headrest device relative to the second headrest device, wherein the headrest comprises a height-adjusting device for adjusting the height of the first headrest device relative to the second headrest device. The invention further relates to a vehicle seat, to an armrest and to a device.

BACKGROUND OF THE INVENTION

Vehicle seats having a headrest and having a backrest are generally known. Vehicle seats which comprise a tilting device for tilting the headrest relative to the backrest are known. In such vehicle seats, for example, the tilting device is arranged in the headrest or in the backrest or integrated in the vehicle seat or in the seat. Such a tilting device for example allows a better view if the vehicle seat is not occupied. Also known are vehicle seats which comprise a height-adjusting device for adjusting the height of the headrest relative to the backrest. In such vehicle seats, the height-adjusting device is for example arranged in the headrest.

SUMMARY OF THE INVENTION

It is an object of the invention to provide a tiltable and height-adjustable headrest for a vehicle seat having a weight which is low by comparison with the prior art and in a manner which is space- and cost-saving by comparison with the prior art.

The object is achieved by a headrest of a vehicle seat, wherein the headrest comprises a first headrest device and a second headrest device, wherein the headrest comprises a tilting device for tilting the first headrest device relative to the second headrest device, wherein the headrest comprises a height-adjusting device for adjusting the height of the first headrest device relative to the second headrest device. The object is additionally achieved by a headrest for a vehicle seat, wherein the headrest comprises a tilting device for tilting the headrest relative to a backrest of the vehicle seat and wherein the headrest comprises a height-adjusting device for adjusting the height of the headrest relative to the backrest of the vehicle seat. By virtue of the fact that the headrest comprises the tilting device and the height-adjusting device, it is possible to dispense with a tilting device and height-adjusting device in the backrest. This makes it possible to obtain an overall space-saving, lighter and cost-effective vehicle seat. In particular, a space-saving design of the headrest is possible in a tilted headrest position. In addition, it is possible with the aid of the tilting device and height-adjusting device to avoid a collision of the headrest with the backrest with the headrest tilted or when tilting the headrest. The design freedom when designing the headrest and the backrest, in particular when designing the three-dimensional shape of the headrest and the backrest, is thus increased.

According to an advantageous refinement, the second headrest device is connected, preferably connected in a force-fitting and/or form-fitting and/or integrally bonded manner, to the vehicle seat, preferably to a backrest of the vehicle seat.

According to an advantageous refinement, the tilting device and/or the height-adjusting device are or is arranged between a front cladding of the headrest that preferably faces an occupant seated in the vehicle seat and a rear cladding of the backrest that preferably faces away from the occupant. This makes possible a particularly compact and space-saving vehicle seat since the tilting device and/or the height-adjusting device are or is arranged within a cladding of the headrest and the tilting device and/or height-adjusting device do not have to be arranged in regions outside the headrest and/or outside the backrest. In particular, the headrest is designed in such a way that, in the tilted or folded-in position, the headrest is designed to be particularly space-saving in relation to headrests known from the prior art.

According to an advantageous refinement, there is provision that the tilting device and/or the height-adjusting device can be driven, in particular can be electrically driven, by means of a drive unit. As a result, a headrest for a vehicle seat having a drivable tilting device and/or drivable height-adjusting device is provided in an advantageous manner.

According to an advantageous refinement, the drive unit is arranged between the front cladding and the rear cladding. In this respect, it is possible to provide a particularly space-saving vehicle seat having a drivable, height-adjustable and tiltable headrest.

According to an advantageous refinement, the drive unit comprises a motor and a worm gear. In particular, the worm gear allows a one-step worm gear transmission or a three-step worm gear transmission. As a result, a high transmission ratio is provided or made possible. Thus, in particular, the use of a motor which is small or of low power in relation to the prior art is made possible. The tilting device and/or height-adjusting device and motor can thus be arranged between the front cladding and the rear cladding, and a vehicle seat which is space-saving by comparison with the prior art can thus be provided. Such an arrangement additionally makes it possible, by comparison with the prior art, to dispense with further components and a vehicle seat having a low weight and low material and manufacturing costs by comparison with the prior art can thus be provided.

According to an advantageous refinement, there is provision that the tilting device can be driven by means of the worm gear. This makes possible a self-locking or self-securing design of the worm gear or of the tilting device.

According to an advantageous refinement, the headrest is designed in such a way that strength or force line requirements for headrests or vehicle seats can be met. In other words, the headrest according to the invention meets the requirements of strength and load path. This is particularly a challenge in the case of a configuration with a large lever arm and/or a space-saving design. The headrest is in particular designed in such a way that high forces which act on the headrest for example in the event of a rear-end crash or a rear-end collision cannot be transmitted to the drive unit or act on the drive unit only in the form of minor forces. In particular, a secure design of the one-step worm gear transmission ensures that the tilting device is designed to be self-locking or self-securing and the latter thus prevents a transmission of the high forces to the drive unit and thus an overloading of the drive unit.

A further subject of the present invention is a vehicle seat of a motor vehicle, wherein the vehicle seat comprises a first vehicle seat device and a second vehicle seat device, wherein the vehicle seat comprises a tilting device for tilting the first vehicle seat device relative to the second vehicle seat device, wherein the vehicle seat comprises a height-adjusting device for adjusting the height of the first vehicle seat device relative to the second vehicle seat device. The first vehicle seat device preferably comprises a headrest which is integrated into the vehicle seat. In addition, the tilting device and/or the height-adjusting device are preferably arranged between a front cladding of the vehicle seat that preferably faces an occupant seated in the vehicle seat and a rear cladding of the vehicle seat that preferably faces away from the occupant. Furthermore, the vehicle seat preferably comprises a headrest, preferably a headrest according to the invention, which is integrated into the first vehicle seat device. There is particularly preferably provision that the vehicle seat comprises a backrest, wherein the backrest comprises both the first vehicle seat device and the second vehicle seat device, wherein the first vehicle seat device preferably comprises a headrest (integrated HR) which is integrated into the vehicle seat or the first vehicle seat device is the integrated headrest. The tilting device and/or the height-adjusting device can particularly preferably be driven, in particular can be electrically driven, by means of a drive unit. In addition, there is preferably provision that the drive unit is arranged between the front cladding and the rear cladding. Furthermore, the drive unit comprises a motor and a worm gear. In addition, the tilting device can preferably be driven by means of the worm gear. According to the invention, there is preferably provision that the vehicle seat comprises the tilting device according to the invention for tilting the first vehicle seat device with respect to the second vehicle seat device. For example, there is provision that the first vehicle seat device comprises a backrest and that the second vehicle seat device comprises a seat surface.

A further subject of the present invention is an armrest of a vehicle seat, wherein the armrest comprises a first armrest device and a second armrest device, wherein the armrest comprises a tilting device for tilting the first armrest device relative to the second armrest device, wherein the armrest comprises a height-adjusting device for adjusting the height of the first armrest device relative to the second armrest device. The second armrest device is preferably connected, preferably in a force-fitting and/or form-fitting and/or integrally bonded manner, to the vehicle seat, preferably to a backrest of the vehicle seat and/or to a seat surface of the vehicle seat. In addition, the tilting device and/or the height-adjusting device are or is preferably arranged between a front cladding of the armrest that preferably faces an occupant seated in the vehicle seat and a rear cladding of the armrest that preferably faces away from the occupant. Furthermore, there is preferably provision that the armrest comprises the tilting device for tilting the armrest relative to a backrest of the vehicle seat and/or relative to a seat surface of the vehicle seat. The armrest preferably comprises a height-adjusting device for adjusting the height of the armrest relative to the backrest of the vehicle seat and/or relative to the seat surface of the vehicle seat. In addition, there is preferably provision that the tilting device and/or the height-adjusting device can be driven, in particular can be electrically driven, by means of a drive unit. Furthermore, the drive unit is preferably arranged between the front cladding and the rear cladding. In addition, the drive unit preferably comprises a motor and a worm gear. Furthermore, the tilting device can preferably be driven by means of the worm gear. In addition, there is preferably provision that the armrest is designed to be pivotable with respect to a backrest of the vehicle seat and/or with respect to a seat surface of the vehicle seat by means of the tilting device according to the invention.

A further subject of the present invention is a device. The device preferably comprises a first device element and a second device element, wherein the device comprises a tilting device for tilting the first device element relative to the second device element, wherein the device comprises a height-adjusting device for adjusting the height of the first device element relative to the second device element. There is preferably provision that the device comprises a headrest according to the invention and/or a vehicle seat according to the invention and/or an armrest according to the invention. There is preferably provision that the first device element comprises a first headrest device of the headrest according to the invention and that the second device element comprises a second headrest device of the headrest according to the invention. In addition, there is preferably provision that the first device element comprises a first vehicle seat device of the vehicle seat according to the invention and that the second device element comprises a second vehicle seat device of the vehicle seat according to the invention. Furthermore, there is preferably provision that the first device element comprises a first armrest device of the armrest according to the invention and that the second device element comprises a second armrest device of the armrest according to the invention.

Particularly by virtue of the space-saving design and the high resistance of the mechanism of the tilting device and/or of the height-adjusting device and/or of the drive unit, a use of the tilting device and/or of the height-adjusting device and/or of the drive unit in further regions, for example in vehicle seats, is provided.

The advantageous features and effects described in conjunction with the headrest correspondingly also apply alone or in combination to the vehicle seat according to the invention, the armrest according to the invention and the device according to the invention.

Further details and advantages of the invention are described hereinbelow with reference to the exemplary embodiments illustrated in the figures The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic view showing the headrest according to FIG. 2;

FIG. 4 is a schematic view showing the headrest according to FIG. 2 and FIG. 3;

FIG. 5 is a schematic perspective view showing the headrest according to FIG. 2-FIG. 4;

FIG. 8 is a schematic perspective view showing a part of a tilting device of the headrest according to FIG. 2-FIG. 7;

FIG. 9 is a schematic perspective view showing a part of the headrest according to FIG. 2-FIG. 7;

DESCRIPTION OF THE PREFERRED EMBODIMENTS

Figure 1:
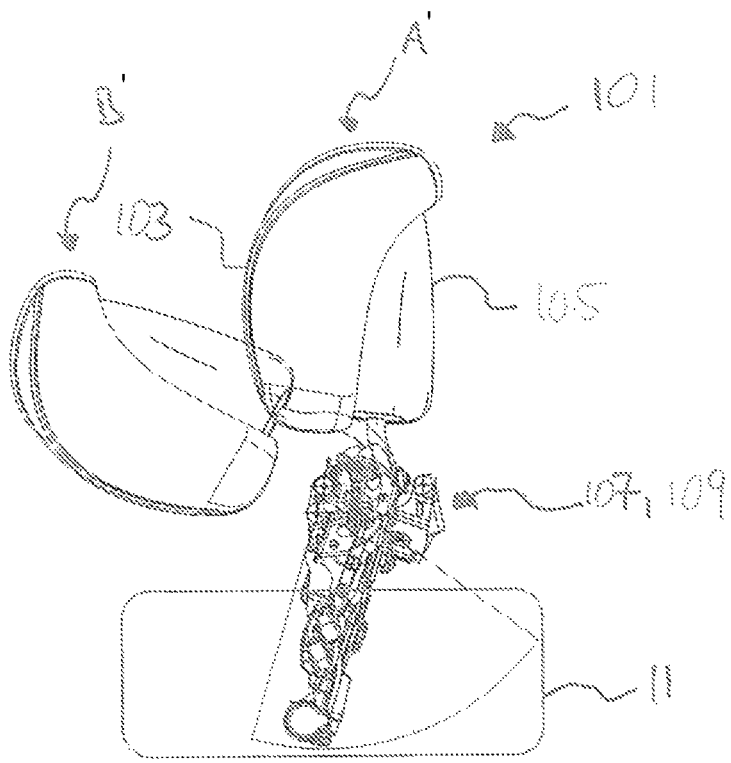
FIG. 1 is a schematic view showing a headrest known from the prior art.

Referring to the drawings, FIG. 1 illustrates a headrest 101 known from the prior art in a schematic illustration. The headrest 101 comprises a front cladding 103 which faces an occupant seated in the vehicle seat and a rear cladding 105 facing away from the occupant. The headrest 101 is connected to a backrest (not shown) via a tilting device 107 and/or height-adjusting device 109. Here, the tilting device 107 and/or the height-adjusting device 109 extend or extends at least partially in a first region 11 which is arranged below the headrest 101, i.e. in the direction of gravitational force. FIG. 1 illustrates the headrest in a starting position A' and in a tilted position B'. A headrest 101 illustrated here is designed for example to be height-adjustable by 70 mm and tiltable through 70°.

Figure 2:
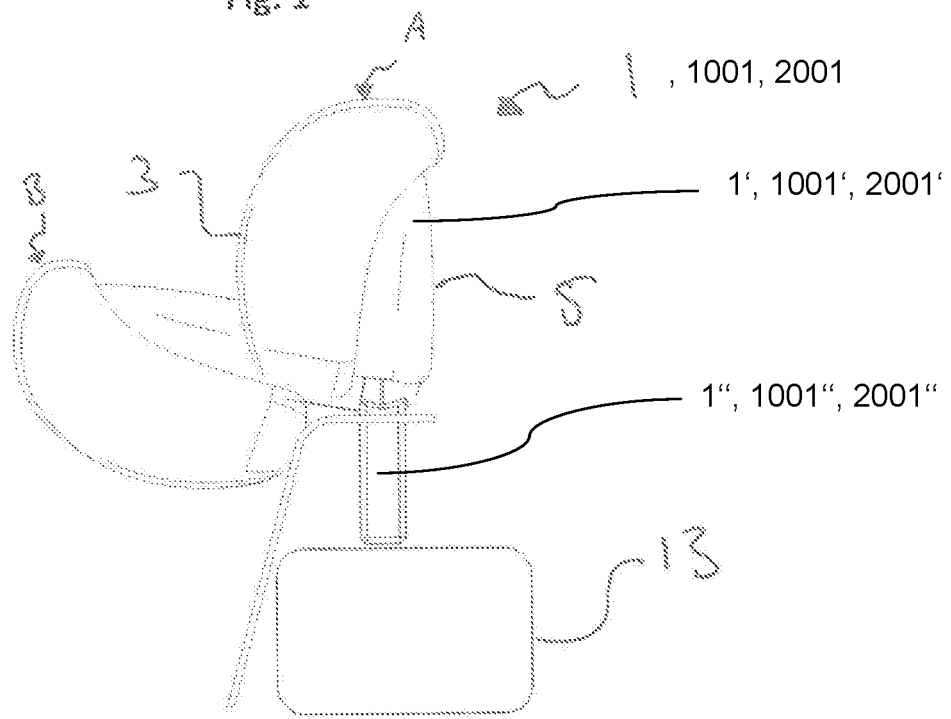
FIG. 2 is a schematic view showing a headrest according to a first exemplary embodiment.

FIG. 2 illustrates a headrest 1 having a front cladding 3 and a rear cladding 5 according to a first exemplary embodiment in a schematic illustration. FIG. 2 illustrates a second region 13 which is not filled by the headrest according to the invention. Here, the second region 13 represents a space saving which is achieved in relation to the first region 11 illustrated in FIG. 1 by the headrest according to the invention. The headrest 1 according to the first exemplary embodiment is designed for example to be height-adjustable by 70 mm and tiltable through 80°.

In addition, FIG. 2 shows that the headrest 1 comprises a first headrest device 1' and a second headrest device 1", wherein the headrest 1 comprises a tilting device 7 (not shown in FIG. 2) for tilting the first headrest device 1' relative to the second headrest device 1", wherein the headrest 1 comprises a height-adjusting device 9 (not shown in FIG. 2) for adjusting the height of the first headrest device 1' relative to the second headrest device 1". Here, the second headrest device 1" is preferably connected, preferably in a force-fitting and/or form-fitting and/or integrally bonded manner, to the vehicle seat, preferably to a backrest of the vehicle seat. In addition, the tilting device 7 and/or the height-adjusting device 9 are or is arranged between a front cladding 3 of the headrest 1 that preferably faces an occupant seated in the vehicle seat and a rear cladding 5 of the headrest 1 that preferably faces away from the occupant. Furthermore, it is preferable that the tilting device 7 and/or the height-adjusting device 9 can be driven, in particular can be electrically driven, by means of a drive unit 15 and that the drive unit 15 is arranged between the front cladding and the rear cladding 5.

Furthermore, FIG. 2 shows at least a part of a vehicle seat 1001 of a motor vehicle, wherein the vehicle seat 1001 comprises a first vehicle seat device 1001' and a second vehicle seat device 1001", wherein the vehicle seat 1001 comprises a tilting device 7 for tilting the first vehicle seat device 1001' relative to the second vehicle seat device 1001", wherein the vehicle seat comprises a height-adjusting device 9 for adjusting the height of the first vehicle seat device 1001' relative to the second vehicle seat device 1001". It is preferable that the first vehicle seat device 1001' comprises a headrest which is integrated into the vehicle seat 1001 and that the tilting device 7 and/or the height-adjusting device 9 are or is arranged between a front cladding 3 of the vehicle seat 1001 that preferably faces an occupant seated in the vehicle seat and a rear cladding 5 of the vehicle seat 1001 that preferably faces away from the occupant.

According to the invention, there is preferably provision that the tilting device 7 according to the invention and the height-adjusting device 9 are used in an armrest of a vehicle seat. The armrest preferably comprises a first armrest device and a second armrest device, wherein the armrest comprises a tilting device 7 for tilting the first armrest device relative to the second armrest device, wherein the armrest comprises a height-adjusting device 9 for adjusting the height of the first armrest device relative to the second armrest device. The second armrest device is preferably connected, preferably in a force-fitting and/or form-fitting and/or integrally bonded manner, to the vehicle seat, preferably to a vehicle seat according to the invention, particularly preferably to a backrest of the vehicle seat and/or to a seat surface of the vehicle seat. In addition, there is provision that the tilting device 7 and/or the height-adjusting device 9 are or is arranged between a front cladding 3 of the armrest that preferably faces an occupant seated in the vehicle seat and a rear cladding 5 of the armrest that preferably faces away from the occupant.

Furthermore, FIG. 2 illustrates a device 2001 according to the invention, wherein the device 2001 comprises a first device element 2001' and a second device element 2001", wherein the device comprises a tilting device 7 for tilting the first device element 2001' relative to the second device element 2001", wherein the device comprises a height-adjusting device 9 for adjusting the height of the first device element 2001' relative to the second device element 2001".

FIGS. 3-5 illustrate the headrest 1 according to FIG. 2 in schematic perspective views and in different positions. FIG. 4a and FIG. 5a show the headrest 1 in the starting position A, FIG. 4c and FIG. 5c show the headrest 1 in the tilted position B, and FIG. 4b and FIG. 5b show the headrest 1 in an intermediate position C. In the intermediate position C, the headrest is adjusted by comparison with the starting position A only in terms of its height. In the exemplary embodiment illustrated in FIGS. 3-5, starting from the starting position A toward the intermediate position C, the headrest 1 is adjusted only in terms of its height, for example by 70 mm, relative to a backrest (not shown) of the vehicle seat. Starting from the intermediate position C toward the tilted position B, the headrest 1 is tilted, for example through 80°, only relative to the backrest (not shown).

Figures 6, 7:
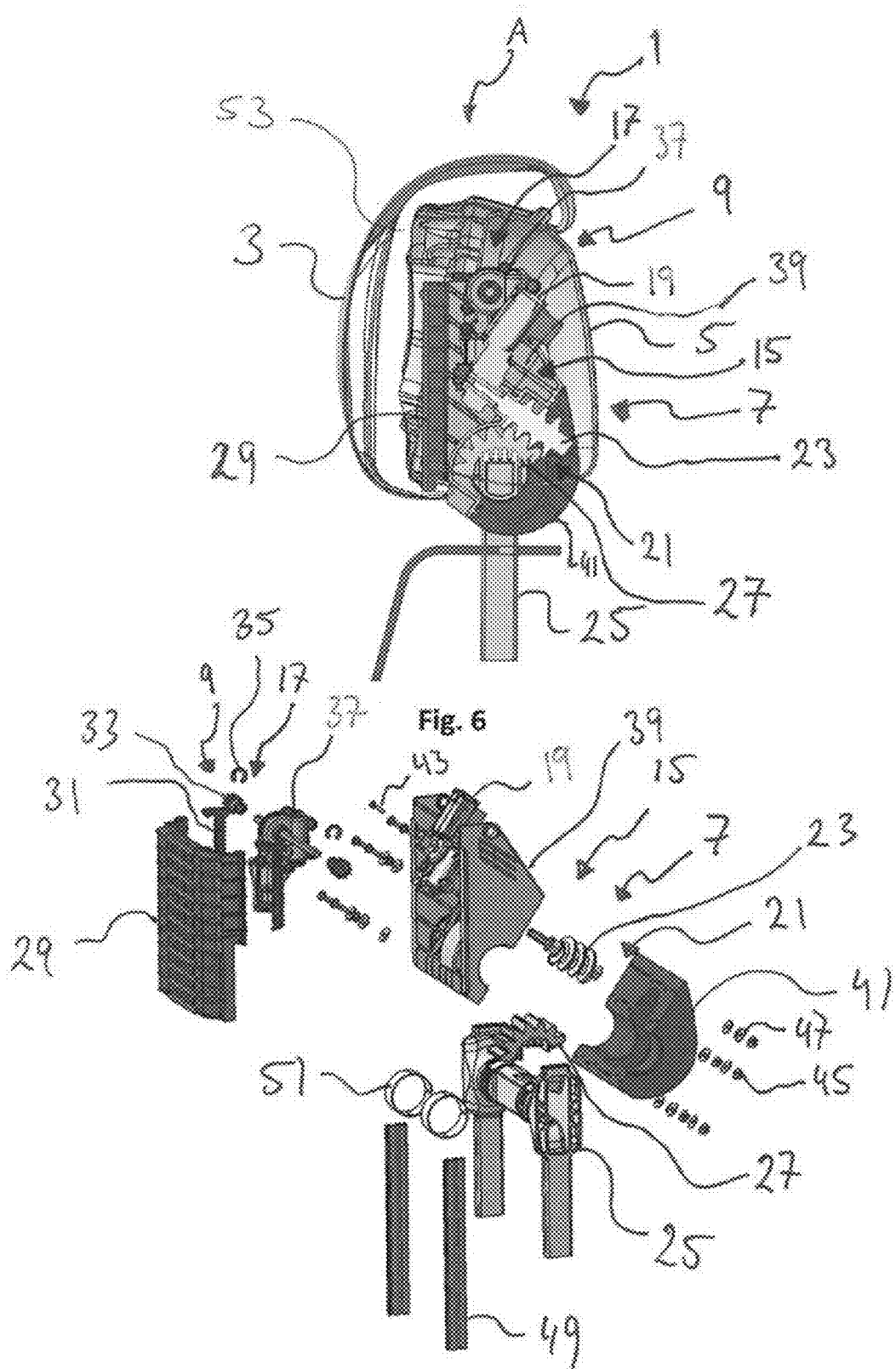
FIG. 6 is a sectional view showing the headrest according to FIG. 2-FIG. 5.
FIG. 7 is an exploded view showing the headrest according to FIG. 2-FIG. 6.

FIG. 6 illustrates the headrest according to FIG. 2-FIG. 5 in a sectional view. It can be seen here that the headrest 1 comprises a tilting device 7 for tilting the headrest relative to a backrest (not shown) of the vehicle seat and a height-adjusting device 9 for adjusting the height of the headrest relative to the backrest of the vehicle seat. In addition, FIG. 6 shows a drive unit 15 by means of which the tilting device 7 can be driven and a further drive unit 17 by means of which the height-adjusting device 9 can be driven. In the exemplary embodiment illustrated in FIG. 6, the tilting device 7, the height-adjusting device 9, the drive unit 15 and the further drive unit 17 are arranged between the front cladding 3 and the rear cladding 5. Furthermore, FIG. 6 shows for example that the drive unit 15 of the tilting device 7 comprises a motor 19 and a worm gear 21. As can be gathered from FIG. 6, the worm gear 21 comprises a rotatably mounted worm thread 23 which can be driven by the motor 19, and a toothed element 27 which is connected to a headrest mount 25. In addition, foam is preferably arranged in the space 53.

FIG. 7 shows the headrest 1 according to FIG. 2-FIG. 6 in an exploded illustration. FIG. 7 illustrates further components of the headrest 1. Thus, FIG. 7 shows for example a front plate 29 and two racks 31, two toothed wheels 33, two axial clamping elements 35 and a further motor 37 of the height-adjusting device 9. Furthermore, FIG. 7 shows a holding element 39, a cover element 41, and screws 43, nuts 45, washers 47, two profiles 49, in particular two metal profiles 49, and two sliding bushes 51. The weight of the module illustrated in FIG. 7 is 1.17 kg, for example.

FIG. 8 and FIG. 9 illustrate parts of the tilting device 7 or of the headrest 1 according to FIG. 2-FIG. 7 in schematic perspective views.

Figure 10:
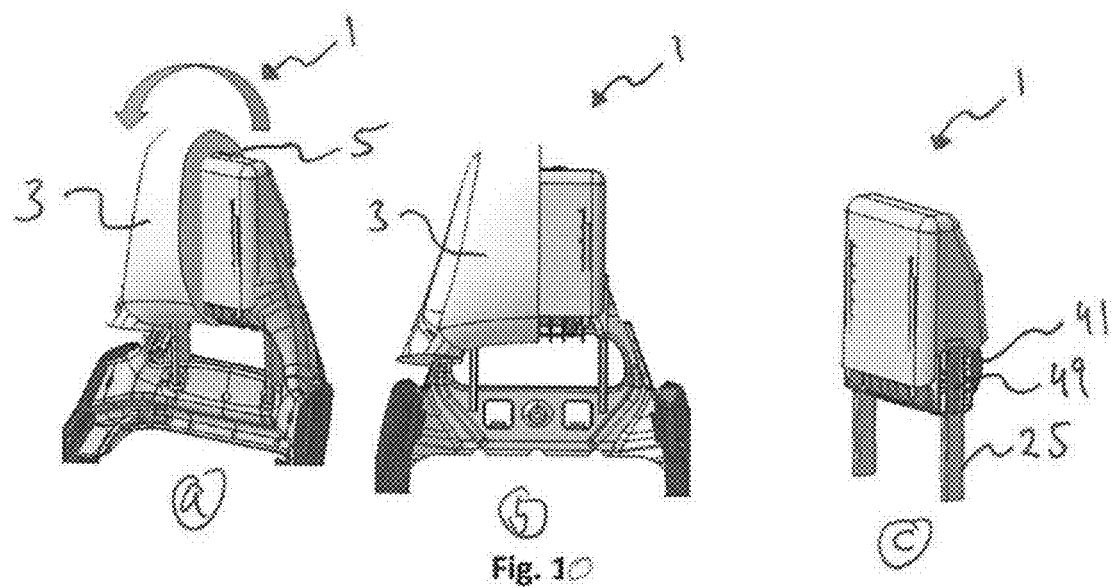
FIG. 10 is a schematic view showing a headrest according to a second exemplary embodiment.
Figure 11:
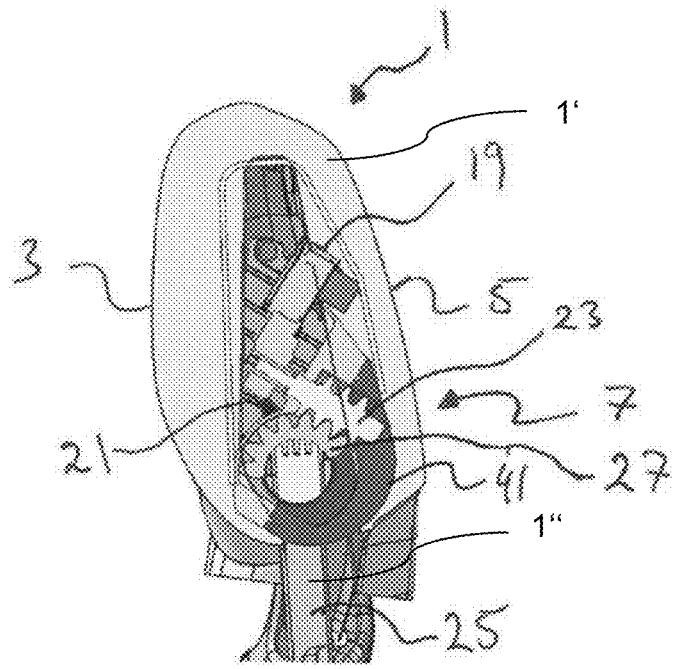
FIG. 11 is a schematic partially sectional view showing the headrest according to FIG. 10.

FIG. 10 and FIG. 11 illustrate a headrest 1 according to a second exemplary embodiment in schematic illustrations. In the second exemplary embodiment, there is substantially only provided the tilting device 7 of the first exemplary embodiment. A further height-adjusting device which differs from the height-adjusting device 9 is only optionally provided.

While specific embodiments of the invention have been shown and described in detail to illustrate the application of the principles of the invention, it will be understood that the invention may be embodied otherwise without departing from such principles.

What is claimed is:

1. A headrest of a vehicle seat, the headrest comprising:
a movable first headrest device;
a second headrest device;
a tilting device for tilting the first headrest device relative to the second headrest device;
a height-adjusting device for adjusting a height of the first headrest device relative to the second headrest device; and
an electric drive unit comprising a motor and a worm gear, wherein the tilting device is configured to be driven by the worm gear, the worm gear including a worm thread and a toothed element, wherein the worm thread is rotatably mounted in the first headrest device and the toothed element is fixedly connected to the second headrest device for no rotation between the toothed element and the second headrest device.

2. The headrest as claimed in claim 1, further comprising a front cladding configured to face an occupant seated in the vehicle seat and a rear cladding configured to face away from the occupant, wherein at least one of the tilting device and the height-adjusting device is arranged between the front cladding and the rear cladding.

3. The headrest as claimed in claim 1, further comprising another electric drive unit, wherein the height-adjusting device is driven by the another electric drive unit.

4. The headrest as claimed in claim 3, further comprising a front cladding configured to face an occupant seated in the vehicle seat and a rear cladding configured to face away from the occupant, wherein the drive unit is arranged between the front cladding and the rear cladding.

5. The headrest as claimed in claim 1, wherein the first headrest device is pivotable relative to the second headrest device in a range from a substantially vertical position to a position about 80 degrees with respect to the substantially vertical position.

6. A vehicle seat of a motor vehicle the vehicle seat comprising:
a movable first vehicle seat device;
a second vehicle seat device;
a tilting device for tilting the first vehicle seat device relative to the second vehicle seat device;
a height-adjusting device for adjusting the height of the first vehicle seat device relative to the second vehicle seat device; and
an electric drive unit comprising a motor and a worm gear, wherein the tilting device is configured to be driven by the worm gear, the worm gear including a worm thread and a toothed element, wherein the worm thread is rotatably mounted in the first vehicle seat device and the toothed element is fixedly connected to the second vehicle seat device for no rotation between the toothed element and the second vehicle seat device.

7. The vehicle seat as claimed in claim 6, further comprising a front cladding configured to face an occupant seated in the vehicle seat and a rear cladding configured to face away from the occupant, wherein at least one of the tilting device and the height-adjusting device is arranged between the front cladding and the rear cladding.

8. The vehicle seat as claimed in claim 7, wherein the first vehicle seat device comprises a headrest which is integrated into the vehicle seat.

9. The vehicle seat as claimed in claim 6, wherein the first vehicle seat device is pivotable relative to the second vehicle seat device in a range from a substantially vertical position to a position about 80 degrees with respect to the substantially vertical position.

10. A device comprising:
a movable first device element;
a second device element;
a tilting device for tilting the first device element relative to the second device element;
a height-adjusting device for adjusting the height of the first device element relative to the second device element; and
an electric drive unit comprising a motor and a worm gear, wherein the tilting device is configured to be driven by the worm gear, the worm gear including a worm thread and a toothed element, wherein the worm thread is rotatably mounted in the first device element and the toothed element is fixedly connected to the second device element for no rotation between the toothed element and the second device element.

11. The device as claimed in claim 10, further comprising another electric drive unit, wherein the height-adjusting device is driven by the another electric drive unit.

12. The device as claimed in claim 11, further comprising a front cladding configured to face an occupant and a rear cladding configured to face away from the occupant, wherein the electric drive unit and the another electric drive unit are arranged between the front cladding and the rear cladding.

13. The device as claimed in claim 10, wherein the first device element is pivotable relative to the second device element in a range from a substantially vertical position to a position about 80 degrees with respect to the substantially vertical position.

14. A headrest comprising:
a movable headrest structure comprising a headrest outer surface for supporting a user;
a headrest holder configured to extend outward of a seat, the headrest holder being connected to the headrest structure;
a tilting device comprising a drive unit, the drive unit comprising a motor and a worm gear, wherein actuation of the motor actuates the worm gear such that actuation of the worm gear tilts the headrest structure relative to the headrest holder; and
a height-adjusting device configured to adjust a height of the headrest structure relative to the headrest holder, the worm gear including a worm thread and a toothed element, wherein the worm thread is rotatably mounted in the headrest structure and the toothed element is fixedly connected to the headrest holder for no rotation between the toothed element and the headrest holder.

15. The headrest as claimed in claim 14, wherein the height-adjusting device comprises another drive unit, wherein the height of the headrest structure is adjustable via actuation of the another drive unit.

16. The headrest as claimed in claim 15, further comprising a front cladding configured to face the user and a rear cladding configured to face away from the user, wherein the drive unit and the another drive unit are arranged between the front cladding and the rear cladding.

17. The headrest as claimed in claim 14, wherein the headrest structure comprises a headrest structure interior space, the tilting device and the height-adjusting device being completely surrounded by the headrest structure.

18. The headrest as claimed in claim 14, wherein the headrest structure comprises a headrest structure interior space, the tilting device and the height-adjusting device being completely surrounded by the headrest structure in each position of the headrest structure.

19. The headrest as claimed in claim 14, wherein the headrest structure is pivotable in a direction of the seat via actuation of the drive unit.

20. The headrest as claimed in claim 14, wherein the headrest structure is pivotable relative to the headrest holder in a range from a substantially vertical position to a position about 80 degrees with respect to the substantially vertical position.

* * * * *